(12) United States Patent
Simmons et al.

(10) Patent No.: US 7,817,976 B2
(45) Date of Patent: *Oct. 19, 2010

(54) SYSTEM AND METHOD FOR INVERTING AUTOMATIC FREQUENCY CONTROL

(75) Inventors: Sean B. Simmons, Waterloo (CA); Zoltan Kemenczy, Mississauga (CA)

(73) Assignee: Research In Motion Limited, Waterloo (CA)

( * ) Notice: Subject to any disclaimer, the term of this patent is extended or adjusted under 35 U.S.C. 154(b) by 5 days.

This patent is subject to a terminal disclaimer.

(21) Appl. No.: 12/336,595

(22) Filed: Dec. 17, 2008

(65) Prior Publication Data

US 2009/0098830 A1  Apr. 16, 2009

Related U.S. Application Data

(63) Continuation of application No. 11/183,681, filed on Jul. 18, 2005, now Pat. No. 7,471,937, which is a continuation of application No. 09/990,553, filed on Nov. 21, 2001, now Pat. No. 6,920,190.

(60) Provisional application No. 60/252,795, filed on Nov. 21, 2000.

(51) Int. Cl.
*H04B 1/18* (2006.01)
(52) U.S. Cl. ............. 455/173.1; 455/182.2; 455/183.1; 455/136; 455/164.1; 375/344; 375/354
(58) Field of Classification Search ................ 455/96.1, 455/196.1, 136, 138, 139, 146–148, 343.1–343.6, 455/164.1–164.2, 165.1, 173.1, 182.1–183.2, 455/192.1–192.3, 197.1, 208, 209, 226.1, 455/227, 230, 234.1, 234.2, 255–260, 265, 455/275, 313–316, 75, 76, 572–574, 556.1; 375/344, 354, 355
See application file for complete search history.

(56) References Cited

U.S. PATENT DOCUMENTS

| 3,852,519 | A | | 12/1974 | Court |
| 3,909,722 | A | | 9/1975 | Bennett, Jr. |
| 4,024,461 | A | | 5/1977 | Ohsawa |
| 4,198,604 | A | * | 4/1980 | Holdaway .................... 455/260 |
| 4,259,644 | A | * | 3/1981 | Iimura ........................... 331/2 |
| 4,518,922 | A | | 5/1985 | Luecke |
| 4,631,499 | A | * | 12/1986 | Kasperkovitz ............... 331/11 |
| 4,742,566 | A | * | 5/1988 | Nordholt et al. ............. 455/260 |
| 4,977,613 | A | * | 12/1990 | Holcomb et al. ......... 455/182.3 |
| 5,440,587 | A | | 8/1995 | Ishikawa et al. |
| 5,479,136 | A | * | 12/1995 | Endo et al. ..................... 331/2 |
| 5,633,898 | A | | 5/1997 | Kishigami et al. |
| 5,729,570 | A | | 3/1998 | Magill |
| 5,828,710 | A | * | 10/1998 | Beale ......................... 375/344 |
| 6,133,871 | A | | 10/2000 | Krasner |
| 6,223,061 | B1 | | 4/2001 | Dacus et al. |
| 6,226,335 | B1 | | 5/2001 | Prozorov |

(Continued)

*Primary Examiner*—Edward Urban
*Assistant Examiner*—Junpeng Chen
(74) *Attorney, Agent, or Firm*—Jones Day; Krishna K. Pathiyal; Robert C. Liang

(57) ABSTRACT

A method includes a foreground process and a background process. In the foreground process, an input signal is processed using a first reference signal to generate an output. A first frequency control signal is generated from the output. A frequency of the first reference signal is controlled based on the first frequency control signal. In the background process, a foreground processed signal is received from the foreground process. The foreground processed signal is processed using a second reference signal. A second frequency control signal is generated from the foreground processed signal. A frequency of the second reference signal is controlled based on the second frequency control signal so that the background processing step removes effects of the foreground controlling step.

6 Claims, 8 Drawing Sheets

U.S. PATENT DOCUMENTS

| | | |
|---|---|---|
| RE37,326 E | 8/2001 | Kim |
| 6,463,266 B1 | 10/2002 | Shohara |
| 6,493,406 B1 | 12/2002 | Schweickert et al. |
| 6,606,490 B1 | 8/2003 | Rainish et al. |
| 6,700,940 B1 | 3/2004 | Katoh et al. |
| 6,704,377 B1 * | 3/2004 | Hsuan ........................ 375/346 |

* cited by examiner

PRIOR ART

FIG. 3
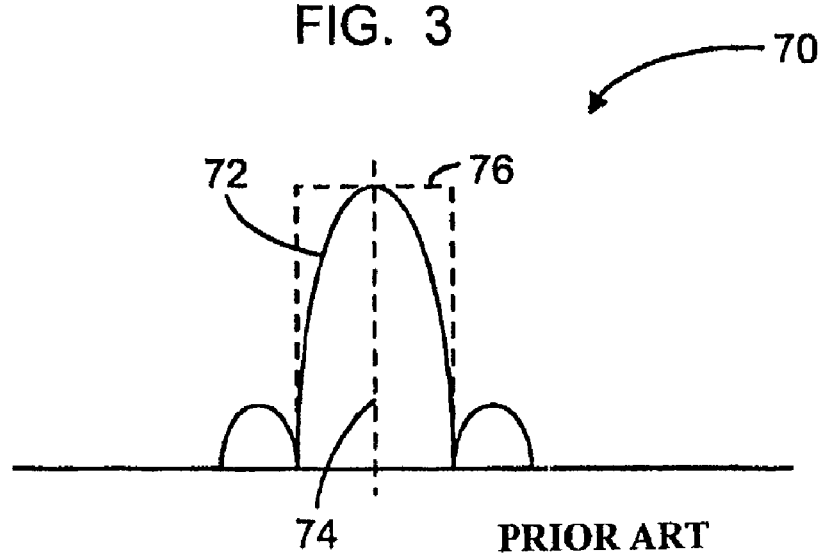
PRIOR ART
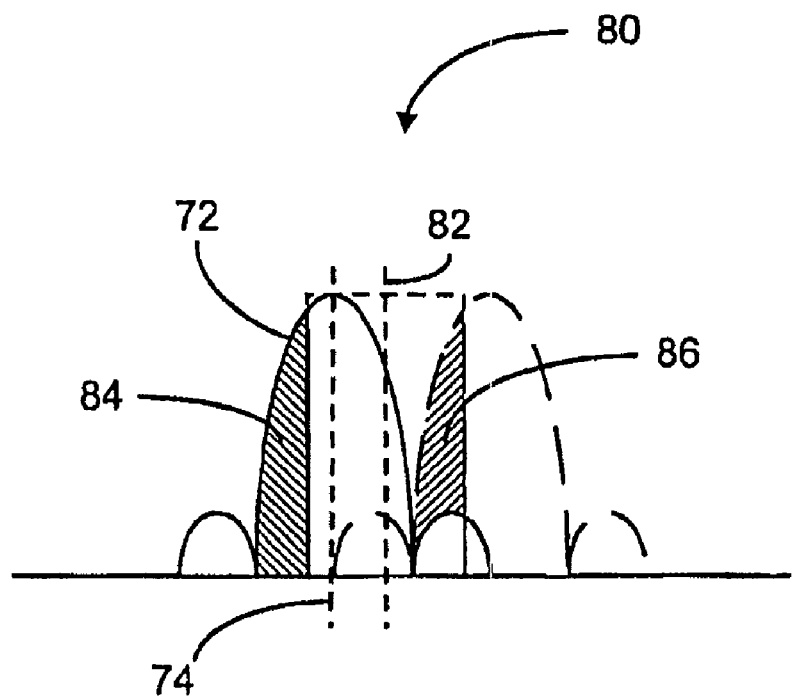
FIG. 4
PRIOR ART

SYSTEM AND METHOD FOR INVERTING AUTOMATIC FREQUENCY CONTROL

CROSS-REFERENCE TO RELATED APPLICATION

This is a continuation of U.S. patent application Ser. No. 11/183,681, filed Jul. 18, 2005, now U.S. Pat. No. 7,471,937 which is a continuation of U.S. patent application Ser. No. 09/990,553, filed Nov. 21, 2001 (now U.S. Pat. No. 6,920,190), which claims benefit of U.S. Provisional Application No. 60/252,795, filed Nov. 21, 2000, all three applications hereby incorporated herein by reference.

TECHNICAL FIELD

This invention relates to frequency control in a communication device.

BACKGROUND

For communication devices to be effective, it is required that a receiver and a transmitter be tuned to the same frequency. Such a requirement may seem trivial on the outset, but it is not often easily achieved. Receivers are designed for operation within a certain band of frequencies. Receivers require reference signals to keep them in tune with the frequencies they are to receive. Such reference signals are often provided by a local oscillator. Since a transmitter and receiver rarely share the same local oscillator, there is often a frequency offset or output frequency mismatch between local oscillators which affects the ability of the receiver to accurately receive a signal from the transmitter.

The present invention addresses the problem of frequency offset.

SUMMARY

According to an aspect of the invention, a communication signal receiver comprises a foreground processing section having a foreground automatic frequency control (AFC) loop configured to control a frequency of a first reference signal used to process a received signal, and a background processing section configured to control a frequency of a second reference signal used to process an output signal of the foreground processing section, wherein the frequency of the second reference signal is controlled so that effects of the foreground AFC loop are removed from the output signal of the foreground processing section.

In accordance with a further aspect of the invention, a method for processing a communication signal comprises a foreground process comprising the steps of: a) determining if an input communication signal is available, and if a signal is not available terminating the process, b) processing the input signal using a first reference signal, c) passing the output from step b) through a foreground AFC unit to generate a first frequency control signal; and d) controlling a frequency of the first reference signal based on the first frequency control signal, and a background process comprising the steps of: a) receiving a foreground processed signal from the foreground process; b) processing the foreground processed signal using a second reference signal, c) passing the foreground processed signal through a background AFC unit to generate a second frequency control signal, and d) controlling a frequency of the second reference signal based on the second frequency control signal so that the step of processing the foreground processed signal removes effects of the foreground process step of controlling the frequency of the first reference signal from the foreground processed signal.

In another embodiment of the invention, a communication signal receiver comprises means for foreground processing including means for implementing a foreground AFC loop configured to control a frequency of a first reference signal used to process a received signal, and means for background processing, for controlling a frequency of a second reference signal used to process an output signal of the means for foreground processing, wherein the means for background processing controls the frequency of the second reference signal so that effects of the means for implementing a foreground AFC loop are removed from the output signal of the means for foreground processing.

According to a still further aspect of the invention, a computer readable medium contains instructions for implementing a method for processing a communication signal, the method comprising a foreground process comprising the steps of: a) determining if an input communication signal is available, and if a signal is not available terminating the process, b) processing the input signal using a first reference signal, c) passing the output from step b) through a foreground AFC unit to generate a first frequency control signal, and d) controlling a frequency of the first reference signal based on the first frequency control signal, and a background process comprising the steps of: a) receiving a foreground processed signal from the foreground process, b) processing the foreground processed signal using a second reference signal, c) passing the foreground processed signal through a background AFC unit to generate a second frequency control signal, and d) controlling a frequency of the second reference signal based on the second frequency control signal so that the step of processing the foreground processed signal removes effects of the foreground process step of controlling the frequency of the first reference signal from the foreground processed signal.

In a further embodiment of the invention, a wireless communication device comprises a transceiver configured to transmit and receive communication signals, and a digital signal processor (DSP) operatively coupled to the transceiver, the DSP comprising computer software code for processing a communication signal, by performing the functions of a foreground process comprising the steps of: a) determining if an input communication signal is available, and if a signal is not available terminating the process, b) processing the input signal using a first reference signal, c) passing the output from step b) through a foreground AFC unit to generate a first frequency control signal; and d) controlling a frequency of the first reference signal based on the first frequency control signal, and a background process comprising the steps of: a) receiving a foreground processed signal from the foreground process, b) processing the foreground processed signal using a second reference signal, c) passing the foreground processed signal through a background AFC unit to generate a second frequency control signal, and d) controlling a frequency of the second reference signal based on the second frequency control signal so that the step of processing the foreground processed signal removes effects of the foreground process step of controlling the frequency of the first reference signal from the foreground processed signal.

BRIEF DESCRIPTION OF THE DRAWINGS

For a better understanding of the present invention, and to show more clearly how it can be carried into effect, reference will now be made, by way of example only, to the accompanying drawings in which:

FIG. 3 is a frequency graph illustrating signal characteristics and filter characteristics;

FIG. 4 is a frequency graph illustrating frequency offset as applied to FIG. 3;

DETAILED DESCRIPTION

Figure 1:
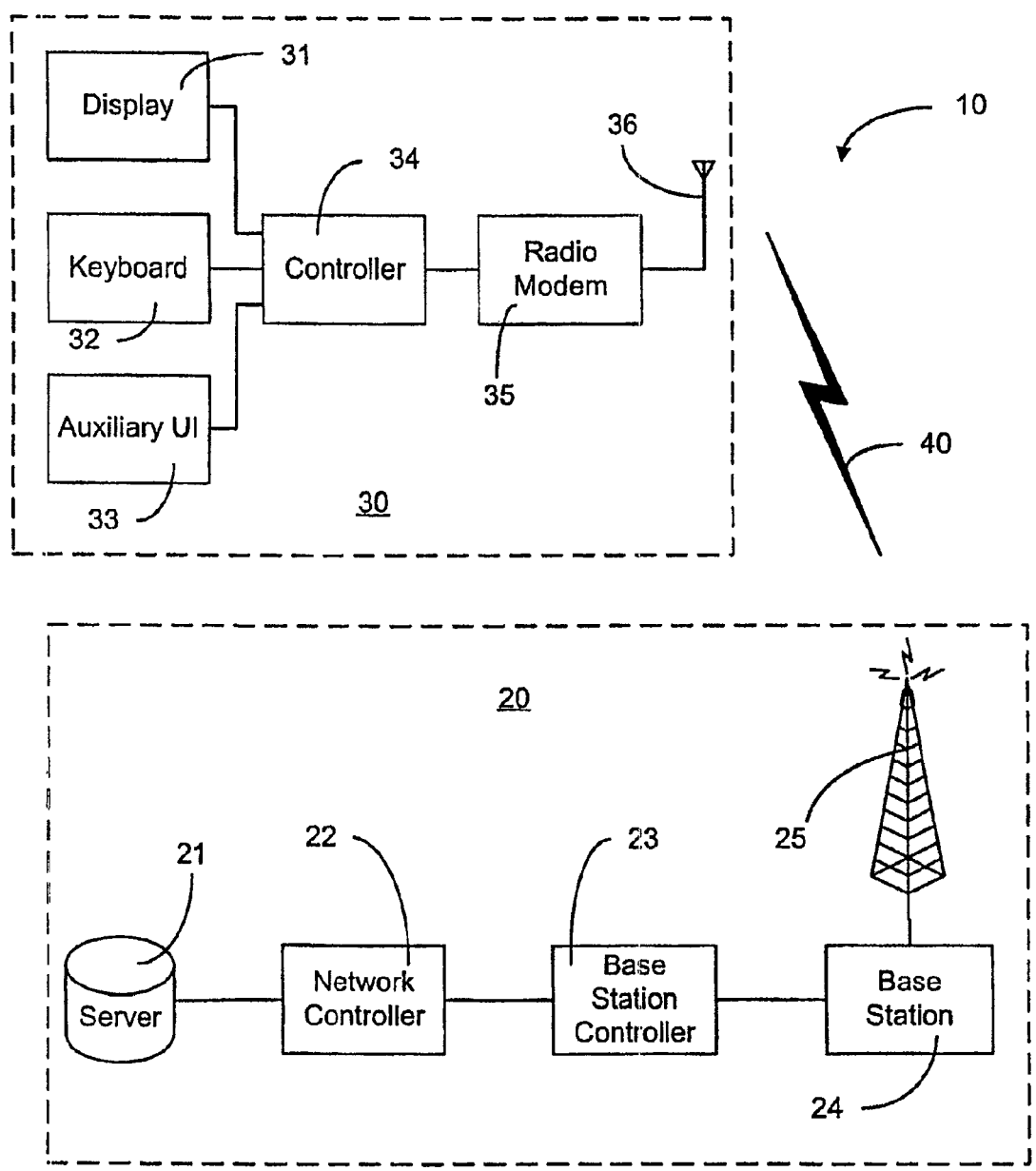
FIG. 1 is a block diagram of a communication system.

To aid the reader in better understanding how the present invention may be utilized, we provide some introductory information on the functioning of a wireless communication network. Referring first to FIG. 1, a block diagram of a communication system is shown generally as 10. System 10 comprises network 20 and mobile communication device 30, which communicate via wireless link 40.

Network 20 comprises a server 21, a network controller 22, a base station controller 23, a base station 24 and an antenna 25.

Server 21 may be any component or system connected within or to network 20. For example, server 21 may be a service provider system, which provides wireless communication services to device 30 and stores data required for routing a communication signal to device 30. Server 21 may also be a gateway to other networks, including but in no way limited to a telephone network, a local area network, or a wide area network such as the Internet. Those skilled in the art to which the present application pertains will appreciate that although only a single server 21 is shown in FIG. 1 a typical network 20 may include multiple servers 21.

Network controller 22 handles routing of communication signals through network 20 to device 30. In the context of a packet switched communication network, network controller 22 must determine a location or address of a device 30 and route packets to a device 30 through one or more routers or switches (not shown) and eventually to a base station 24 serving a network coverage area in which device 30 is currently located.

Base station 24, its associated controller 23 and antenna 25 provide wireless network coverage for a particular coverage area commonly referred to as a "cell". Base station 24 transmits communication signals to and receives communication signals from mobile devices 30 within its cell via antenna 25. Base station 24 normally performs such functions as modulation and possibly encoding and/or encryption of signals to be transmitted to a device 30 in accordance with communication protocols and parameters, under the control of base station controller 23. Base station 24 similarly demodulates and possibly decodes and decrypts if necessary any communication signals received from a device 30 within its cell. Communication protocols and parameters may vary between different networks 20. For example, one network may employ a different modulation scheme and operate at different frequencies than other networks 20.

An actual wireless network 20 such as the Mobitex™ network or DataTAC™ network for example may include a plurality of cells, each served by a distinct base station controller 23, and base station 24. Base station controllers 23 and base stations 24 may be connected by multiple switches and routers (not shown), and controlled by multiple network controllers 22, only one of which is shown in FIG. 1. Similarly, network 20 may also include a plurality of servers 21, including for example storage, routing, processing and gateway components.

Mobile device 30 typically has a display 31, a keyboard 32, and possibly one or more auxiliary user interfaces (UI) 33, connected to a controller 34, which in turn is connected to a radio modem 35 and an antenna 36.

Mobile device 30 sends communication signals to and receives communication signals from network 20 over wireless link 40 via antenna 36. Radio modem 35 performs functions similar to those of base station 24, including for example modulation/demodulation. Radio modem 35 may also provide encoding/decoding and encryption/decryption.

In most modern communication devices 30, controller 34 is a central processing unit (CPU) running operating system software which is stored in a device memory component (not shown). Controller 34 controls overall operation of device 30, whereas signal processing operations associated with communication functions are typically performed in modem 35. Controller 34 interfaces with display 31 to display received information, stored information, user inputs and the like. Keyboard 32, which may be a telephone type keypad or full alphanumeric keyboard, may also utilize auxiliary user interface components 33. Keyboard 32 is normally provided on mobile communication devices for entering data for storage on device 30, information for transmission from device 30 to network 20, a telephone number to place a call from device 30, commands to be executed on device 30, and possibly other or different user inputs.

Device 30 may consist of a single unit, such as a data communication device, a cellular telephone, a multiple-function communication device with data and voice communication capabilities for example, a personal digital assistant (PDA) enabled for wireless communication, or a computer incorporating an internal modem. Device 30 may also be a multiple-module unit, comprising a plurality of separate components, including but in no way limited to a computer or other device connected to a wireless modem. For example, modem 35 and antenna 36 may be implemented as a radio modem unit that may be inserted into a port on a laptop computer. Although only a single device 30 is shown in FIG. 1, it will be obvious to those skilled in the art to which this application pertains that many devices 30, including different types of devices 30, may be active or operable within a wireless communication network 20 at any time.

Figure 2:
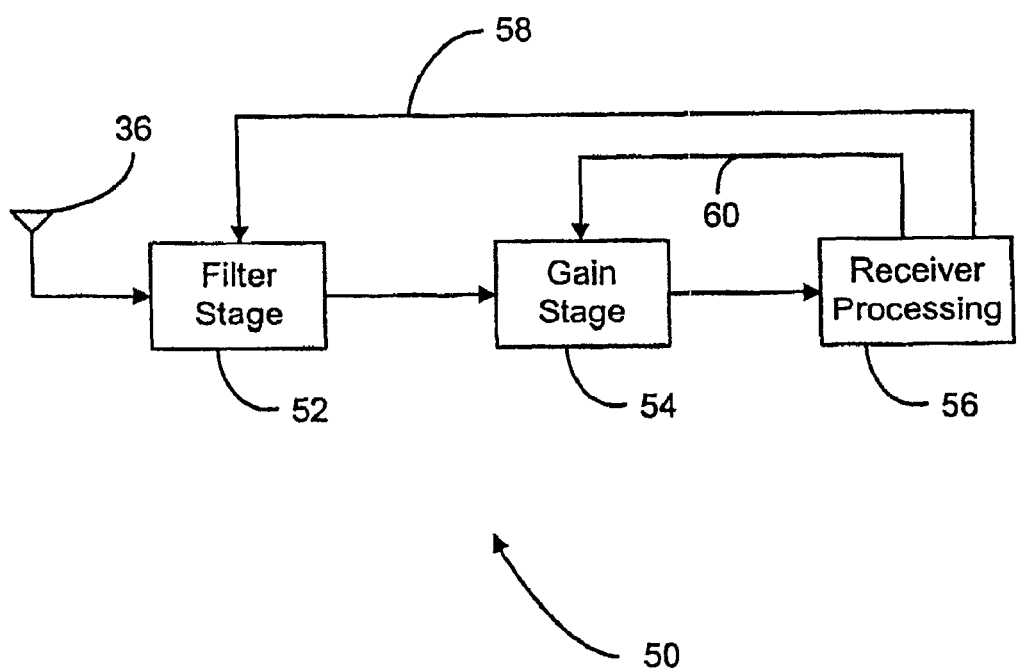
FIG. 2 is a block diagram of a receiver.

Referring now to FIG. 2, a block diagram of receiver is shown generally as 50. Receiver 50 is contained within radio modem 35. FIG. 2 illustrates a very general receiver 50 and is intended only as a basic illustration. A signal received by antenna 36 is filtered by filter stage 52 to separate a signal at a particular desired frequency from other components of the signal received by antenna 36. Gain stage 54 amplifies the signal selected by filter stage 52. Receiver processing block 56 may include such functions as demodulation, decoding and further signal processing. Various control signals for filter stage 52 and gain stage 54 can be generated by processing block 56 and supplied as input to filter stage 52 via control path 58 and to gain stage 54 via control path 60.

Receiver 50 is a very general receiver structure and is intended only as an illustrative example thereof. The implementation of this general structure will vary considerably, depending upon the particular receiver application and manufacturer. For example, different receivers may obviously operate in different frequency bands and detect different channels, leading to differences in filter design. Different manufacturers may also use different components to realize the various receiver circuits.

Referring now to FIG. 3 a frequency graph illustrating signal characteristics and filter characteristics is shown generally as 70. A waveform 72 represents an arbitrary signal sent on a channel having a centre frequency 74. Ideally, a receiver 50 would be able to filter signal 72 with a band pass filter having a band pass characteristic 76 centred at frequency 74.

Referring now to FIG. 4, a frequency graph illustrating frequency offset as applied to FIG. 3, is shown generally as 80. Any frequency offset between a transmitter and a receiver will affect receiver filtering. Frequency 82 is the result of a frequency offset between reference signals produced by oscillators at the transmitter and the receiver. Frequency offset effectively renders a receiver incapable of accurately centring a required filter at the frequency 74. As a result, the receiver filtering operation filters out part of the desired signal 72, designated by shaded area 84, and recovers additional noise from a transmission signal on an adjacent channel, shown in FIG. 4 as shaded area 86. Therefore, frequency offset both reduces the received signal power for a desired signal and increases noise in the filtered signal. The overall effect on the signal to noise ratio (SNR) of a received signal can be significant. Since receiver operation quickly degrades for decreasing SNR, frequency offset should be minimized. In practical systems, communication channel frequencies would be separated sufficiently to ensure that signals are spaced farther apart than shown in FIG. 4. The desired and adjacent channel characteristics have intentionally been crowded in FIG. 4 for illustrative purposes.

Figure 5:
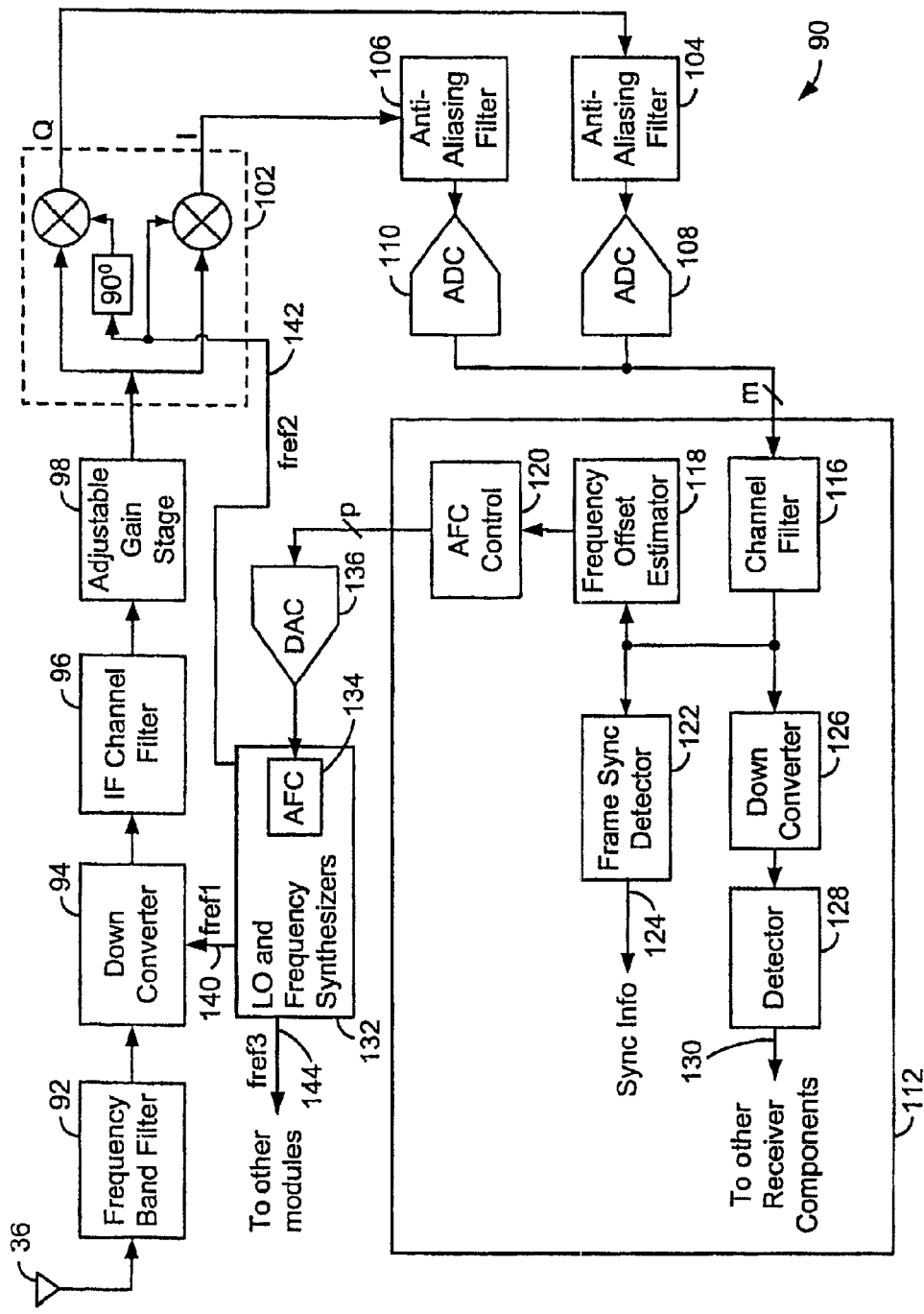
FIG. 5 is a block diagram of a known receiver.

Before discussing the present invention and how it addresses the problem of frequency offset and conventional AFC, we will first discuss a known receiver in detail as shown in FIG. 5. Referring now to FIG. 5, a block diagram of a receiver is shown generally as 90. FIG. 5 illustrates in detail an implementation of a receiver 50 of FIG. 2.

A signal received from antenna 36 is filtered by frequency band filter 92. Down converter stage 94 converts the filtered signal from filter 92, typically an RF signal, to intermediate frequency (IF), creating a down converted signal, which is passed to IF channel filter 96. IF channel filter 96 filters the down converted signal to select a particular IF channel in the down converted signal. The output from IF channel filter 96 is then passed to gain stage 98, which may amplify the signal on the desired channel under the control of a gain control system (not shown).

A quadrature mixer 102 separates the in-phase (I) and quadrature (Q) components of the received signal. Low pass filter 104 filters out alias signals from the Q output of mixer 102 and limits the input bandwidth sampled by the analog to digital converter (ADC) 108. Filter 106 provides the same function for the I output of mixer 102 and is connected to ADC 110. ADCs 108 and 110 are often used in communication signal receivers such as receiver 90, since many receivers perform signal processing functions in the digital domain.

Digital outputs from ADCs 108 and 110 are input to a digital signal processor (DSP) 112, via an m-bit bus for example. One function of DSP 112 is to generate automatic frequency control (AFC) signals that control the local oscillator (LO) and frequency synthesizers designated generally as block 132. In receiver 90, the I and Q components from ADCs 108 and 110 are input to channel filter 116 of DSP 112. The output from filter 116 is input to a frequency offset estimator 118, which estimates a frequency offset between a LO at receiver 90 and an oscillator at a transmitter from which a received signal is received. The estimated offset is then input to an AFC control unit 120. In accordance with an AFC algorithm, the AFC control unit 120 determines an appropriate AFC control signal. The AFC control signal, a p-bit digital signal in the example receiver in FIG. 5, is input to an AFC unit 134 which in turn controls the frequency synthesizers 132 to correct for the estimated frequency offset. Since DSP 112 is a digital component and frequency synthesizers 132 typically use analog control signals, a digital to analog converter (DAC) 136 is required. If the receiver 90 includes digital frequency synthesizers however, the DAC 136 in receiver 90 would not be necessary.

In addition to the frequency control function discussed above, DSP 112 may also perform other functions. For example, DSP 112 may include a frame synchronization (sync) detector 122, which detects a unique frame synchronization pattern or signal that is periodically inserted in a transmitted signal to maintain synchronization between a transmitter and receiver. It will be apparent to those skilled in the art to which the present application pertains that in the Mobitex™ wireless communication system for example, the maximum length of a transmitted frame is about 1 second, so a Mobitex receiver should receive a frame sync pattern at least once every second. Frame sync detector 122 outputs synchronization information 124 that may be used by receiver components to process a signal received by receiver 90. For example, the DSP 112 may also include a down converter 126 and a detector or demodulator 128 which may use synchronization information provided by a frame sync detector 122. Down converter 126 converts the output signal from channel filter 116 to a lower frequency to facilitate further digital processing of the filtered digital signal from the channel filter 116. Detector 128 demodulates the down converted signal in accordance with a modulation scheme used in the communication system in which the receiver operates. In the above example Mobitex system, the modulation scheme is Gaussian Minimum Shift Keying (GMSK). However, the present invention is in no way limited thereto. Other modulation schemes will be apparent to those skilled in the art and are therefore considered to be within the scope of the invention.

The demodulated signal 130 from detector 128 can then be further processed by other components of the receiver 90. These other receiver components may include further DSP components, and/or components that are not implemented as part of the DSP 112. Although these other receiver components will differ for different receivers, many receivers include components to perform one or more of the operations of descrambling, deinterleaving, decoding, decryption, error checking and error correction. In addition, a microprocessor or software application in a communication device in which the receiver 90 is implemented may process data in a received signal.

Communication devices including a receiver such as receiver 90 are designed for operation within a certain band of frequencies. A mobile device which operates on the Mobitex mobile communication system receives signals in a RF band of 935 Hz to 941 MHz. In a Mobitex receiver, RF band filter 92 would be a band pass filter centred within this RF band. Internal operations within a communication device may also be performed at further different frequencies. In receiver 90, filters 96 and 116 are band pass filters, but operate at different frequencies and have different bandwidths than RF band filter 92.

Typical receivers such as receiver 90 require reference frequency or clock signals, which are normally generated within the receiver. In the example receiver 90, LO and frequency synthesizers 132 generate three reference frequencies, fref1 (140), fref2 (142) and fref3 (144). Reference frequency fref1 140 is supplied to down converter 94, fref2 142 is supplied to quadrature mixer 102 and fref3 146 may be supplied to other receiver modules. For example, fref3 144 may be supplied to down converter 126, to other modules in DSP 112 or receiver 90, or even to modules in a transmitter (not shown) implemented in the same communication device as receiver 90.

The effective operation of a communication device is highly dependent upon the accuracy of the synthesized reference frequencies and thus upon the LO. In most communication systems, a signal transmitted by a communication device is intended for reception by a different communication device. Since communication devices rarely share the same LO for their respective frequency synthesis operations, there is typically a frequency offset, or output frequency mismatch, between LOs which significantly affects communication signal reception. The above example Mobitex mobile communication system includes thousands of base stations and millions of mobile communication devices, each base station and mobile device having its own LO. Perfect matching of so many LOs cannot possibly be achieved for all operating conditions.

Although perfect LO matching is not possible, devices in a communication system must be able to communicate over common channels. In a mobile communication system, a mobile device must receive a signal transmitted on a particular channel by a base station. As known in the art, base station oscillators are relatively accurate and stable, whereas LOs in mobile communication devices tend to be less reliable, typically varying from nominal output frequency by to ±6 kHz.

AFC arrangements are typically used to ensure that frequency offset between transmitter and receiver LOs is compensated. If frequency offset reaches a certain level, for example ±1 kHz in typical receivers, the receiver ceases operation. For frequency offsets above this certain level, which will be different for different communication systems and devices, a receiver will be unable to detect the transmitted signal.

The goal of known AFC arrangements is to quickly estimate and adjust for frequency offset. Ideally, the receiver AFC 134 calculates an exact offset and then maintains the resultant AFC signal. The receiver LO 132 then generates a substantially constant output, corrected for the frequency offset. In actual receivers however, ideal AFC operation is rarely if ever achieved. AFC arrangements continuously estimate frequency offset and update AFC signals as frequency offset estimates change, which results in changes in receiver LO output frequency. If accurate offset estimates were easily generated, then near-ideal operation could be achieved by conventional AFC arrangements.

Frequency offsets are in reality very difficult to accurately estimate. This is one reason why conventional AFC is typically a continuous operation and implemented as a closed loop control system. Even if actual frequency offset is relatively constant, closed loop AFC will not immediately settle on an accurate offset estimate and correction. The estimate and resultant correction will tend to overshoot and undershoot the actual offset and required correction during a gradual settling process. Since the actual frequency offset is seldom constant, particularly in mobile communication systems, this settling can be ongoing for the duration of a signal reception operation. The overall effect is that conventional AFC arrangements tend to estimate and correct for frequency offset within a certain range, typically on the order of several hundred Hz, of actual frequency offset. The inherent overshoot and undershoot of actual frequency offset during the settling process also causes variations in the frequencies of frequency-controlled signals and processed signals that are dependent on such frequency-controlled signals. These frequency variations may also cause problems for certain receiver components.

If other receiver components such as the detector 128 in receiver 90 can tolerate such frequency offsets and variations, then conventional AFC arrangements are sufficient. However, some detectors are more sensitive to frequency offset, such that instead of the above example 1 kHz, offsets of only up to 200 Hz are acceptable. For example, detectors designed for soft decision processing tend to be more sensitive to frequency offset, but may offer better receiver performance than a less sensitive hard decision-based detector. Soft decision signal processing also tends to be sensitive to frequency variations caused by conventional AFC.

Another problem associated with some types of conventional AFC is that the typical closed loop arrangement shown in FIG. 5 can be thrown off by long strings of '1' or '0' bits. In an existing AFC arrangement used in known frequency modulation (FM) communication systems, AFC 134 operates to maintain the average frequency of the received signal at 0 Hz. If a long string of 1's or 0's is received, the average frequency of the received signal is no longer 0 Hz, but AFC 134 continues to operate as though the average frequency should be 0 Hz and therefore incorrectly estimates the frequency offset. This data dependency degrades receiver performance, as the correction applied by the AFC arrangement is not always based on an accurate offset estimate.

A simple solution to the above problems would be to slow the AFC response. A slower AFC arrangement would tend to exhibit less pronounced overshoot and undershoot on offset estimation. Slowing the AFC would also reduce data dependency of offset estimation. Although possible, practical implementation of this solution would be at the considerable cost of increasing wait times. A slower AFC arrangement would require more time to correct for larger frequency offsets and result in increased delay time before a signal can be reliably received on a particular channel. The increased wait times not only inconvenience users of communication devices, but also increase power consumption of a device. In mobile communication systems, increased wait times can be especially problematic, particularly when a mobile receiver frequently crosses between service areas of different base stations, requiring frequency offset correction for each new channel assigned by each different base station. Furthermore, increased receiver power consumption decreases battery life for mobile and other battery-powered devices. Even in applications for which a stable power source is readily available, limiting of power consumption is normally desirable, for example to reduce heat dissipation. For these reasons, slowing the AFC response time is not feasible.

Figure 6:
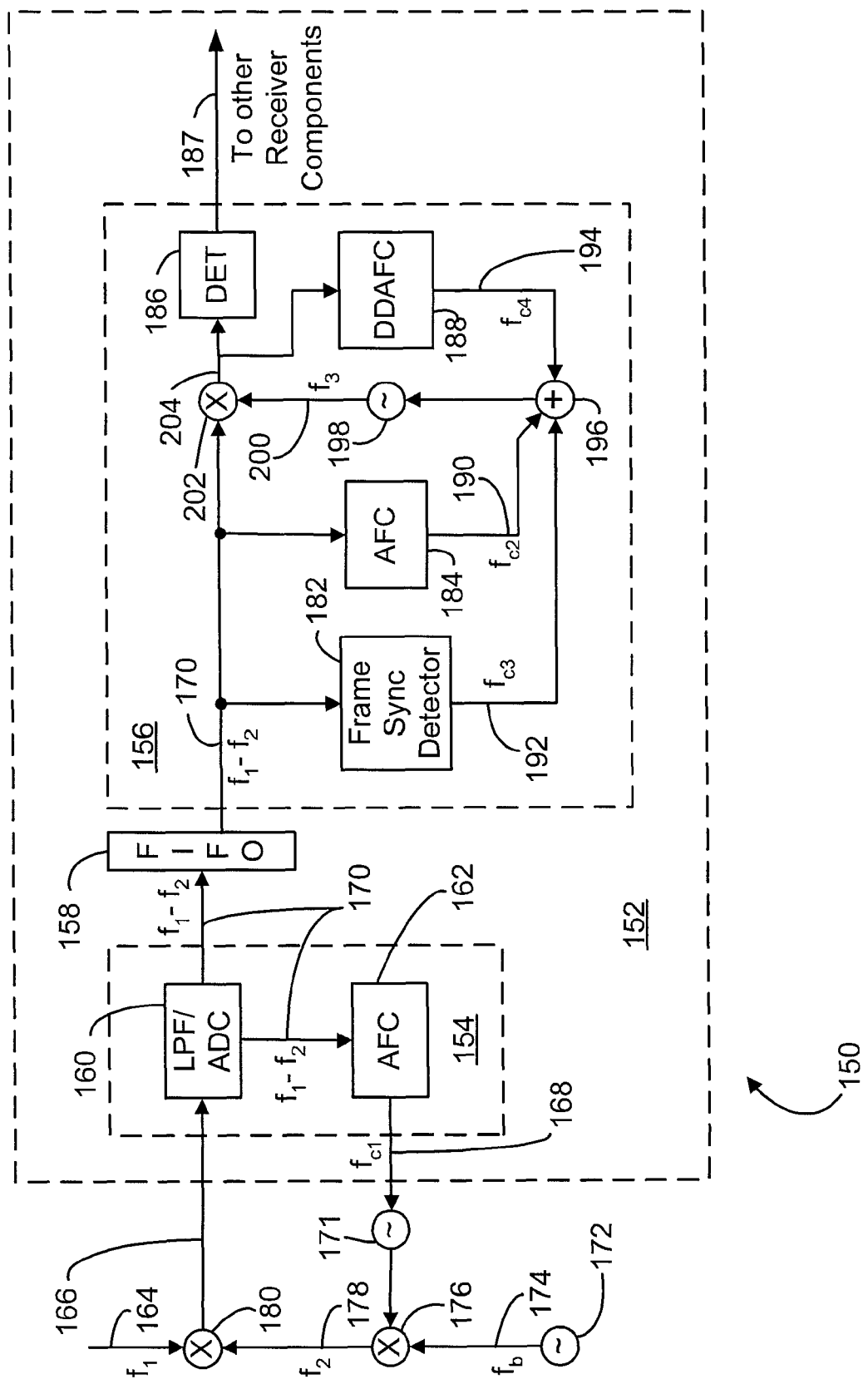
FIG. 6 is a block diagram of a component of a receiver implementing the present invention.

Referring now to FIG. 6, a block diagram of a component of a receiver implementing a system according to an aspect of the present invention is shown generally as 150. A receiver utilizing component 150 differs from known receiver 90 in that DSP 152 comprises a foreground processing section 154 and a background processing section 156. Sections 154 and 156 are connected via FIFO buffer 158. FIFO buffer 158 serves to decouple foreground processing section 154 from background processing section 156 due to real time processing constraints. As one skilled in the art will recognize, a FIFO buffer is only one form of buffer that may serve to store data from foreground processing section 154 to background processing section 156. It is not the intent of the inventors to limit buffer 158 to a FIFO implementation. In addition, it should be apparent that the FIFO need not necessarily be provided on the same computer chip as the DSP 152. The FIFO or other buffer may be provided elsewhere in a receiver provided that it is accessible to the foreground and background processing sections 154 and 156.

Foreground processing section 154 processes a signal in real time with low latency. Background processing section 156 provides for more time in analyzing frequency offset and providing the appropriate corrections.

To aid the reader in understanding the signals shown in FIG. 6, we provide the following Table 1 as a reference.

TABLE 1

| FIG. 6 Feature | Signal Label | Description |
| --- | --- | --- |
| 164 | $f_1$ | Mixer input signal having frequency = $f_1$. |
| 178 | $f_2$ | First reference signal used to translate the mixer input signal into the I, Q domain, subject to frequency control values. Frequency = $f_2$ |
| 166 | | The signal resulting from the mixing of signals 164 and 178, having frequency components at $f_1 + f_2$ and $f_1 - f_2$. |
| 170 | $f_1 - f_2$ | Low pass filtered and digitized form of signal 166, comprising a digitized sample stream of the $f_1 - f_2$ component of signal 166. |
| 200 | $f_3$ | The second reference signal, output from oscillator 198, based on a frequency control value equal to the sum of frequency control values $f_{c2}$, $f_{c3}$ and $f_{c4}$. |
| 204 | | The signal resulting from the mixing of signals 170 and 200. |
| 174 | $f_b$ | An LO signal to which frequency control is applied via the mixer 176 to generate the reference signal 178. |
| 168 | $f_{c1}$ | First frequency control signal from AFC unit 162. |
| 190 | $f_{c2}$ | Second frequency control signal, from AFC unit 178, the inverse of control signal 168. |
| 192 | $f_{c3}$ | Third frequency control signal, from frame sync detector 182 when a frame sync signal has been detected. |
| 194 | $f_{c4}$ | Fourth frequency control signal, provided by DDAFC unit 188. |

Foreground processing section 154 comprises receiver low pass filter (LPF) and ADC unit 160 and foreground AFC unit 162. LPF/ADC unit 160 may include such components as 104, 106, 108 and 110 of FIG. 5. LPF 160 may also include a filter such as channel filter 116 of FIG. 5, applied after I, Q analog to digital conversion. It should be obvious to those skilled in the art that although the LPF/ADC unit 160 is shown in FIG. 6 as a component of the DSP 152, any analog components of this unit would be provided outside of the DSP 152.

Foreground processing section 154 accepts an input signal 166, and provides an output signal 170. Foreground processing section 154 operates in a continuous loop. The loop begins with input signal 164. The input signal 164 may be an output signal from receiver front-end components such as 36, 92, 94, 96 and 98 shown in FIG. 5. Input signal 164 and first reference signal 178 are input to mixer 180, which may for example be embodied as a quadrature mixer 102 (FIG. 5) to produce input signal 166 for LPF/ADC unit 160. The output of LPF/ADC unit 160 is a digitized I, Q sample stream 170 that is analyzed by foreground AFC 162 and also passed to background processing section 156 via FIFO buffer 158. Foreground AFC 162 accepts as input, the sample stream 170 from LPF/ADC 160 and converts sample stream 170 to instantaneous frequency offset estimates. This is may be achieved by using any standard AFC algorithm. Averaging and additional low pass filtering may also be applied to the frequency offset estimates to produce a frequency control signal $f_{c1}$ 168 required to correct the estimated offset. First frequency control signal $f_{c1}$ 168 is then passed to local oscillator (LO) 171 to control the frequency of the output of the oscillator 171, which output is then input to the mixer 176. Those skilled in the art will appreciate that oscillator 171 is normally an analog component, such that a DAC (not shown in FIG. 6) may be provided to convert the digital frequency control signal $f_{c1}$ output by the AFC unit 162 into an analog frequency control signal, as shown in FIG. 5 and described above. Mixer 176 also accepts as input the signal 174 provided by oscillator 172 to generate the first reference signal 178. Signal 178 has a frequency of local oscillator 172 modified by the frequency of the output signal of oscillator 171, which is controlled by the first frequency control signal 168 from the AFC unit 162. Mixer 180 combines signals 178 and 164 to create input signal 166 to LPF 160.

Mixers such as 176 produce an output signal having frequency components at frequencies equal to both the difference and the sum of the frequencies of its inputs. In many implementations, only one of these components is of interest, while the other is filtered out of an output signal using an LPF or high pass filter (HPF). Such a filter (not shown) may be coupled to the output of the mixer 176 to filter out any unwanted signal components from the signal 178. The oscillators 171 and 172 and mixer 176, as well as an output signal filter, may be part of a local oscillator and frequency synthesis system in a receiver. In the example implementation shown in FIG. 6, the high frequency component of the signal 166, having a frequency of $f_1+f_2$, is filtered out by the LPF/ADC unit 160.

Foreground processing section 154 attempts to bring the frequency $f_2$ of the signal 178 from mixer 176 as close as possible to the frequency $f_1$ of input signal 164 as quickly as possible, by controlling the local oscillator 171.

Thus, one may view the LPF/ADC unit 160, foreground AFC unit 162, local oscillator 171, oscillator 172, mixer 176 and mixer 180 as comprising a foreground AFC loop.

Note that the value of signal 178 varies according to the value of frequency control signal 168. The value of frequency control signal 168 is time varying due to the input noise passed to foreground AFC 162 and the data dependent nature of the frequency offset calculations performed by foreground AFC 162. The amount of input noise passed by foreground AFC 162 is inversely proportional to its speed of operation.

Background processing section 156 comprises frame sync detector 182, background AFC 184, Receiver Detector (DET) 186 and Decision-Directed AFC (DDAFC) 188. The goal of background processing section 156 is to remove the effects of frequency control applied to the original signal 164. This is achieved by combining frequency control signals provided by frame sync detector 182, background AFC 184 and DDAFC 188 to create signal 204 which is passed to DET 186. DET 186 is preferably a soft decision detector block that converts input I, Q samples to soft symbol values on the output 187 to be used by later receiver stages to decode and otherwise further process sent information. Further receiver processing operations may include for example descrambling, deinterleaving, decryption, error checking, error correction, and any processing of the actual data in a received signal by a microprocessor or software application in a communication device, as described above.

As also described above, soft decision detectors and possibly other receiver components downstream in a receiver signal path from the foreground AFC loop may be sensitive to signal frequency variations inherent in AFC schemes. Frequency offset estimate errors may be caused by the speed and data dependency of an AFC algorithm, possibly resulting in frequency variations in the signal 170 beyond levels within which the detector 186 is operable. In FIG. 6, the frequency control signal 168 changes the frequency of the output signal from oscillator 171, which affects the frequency of the reference signal 178, which in turn affects the signals 166 and thus 170. The background processing section 156, by inverting the AFC of the foreground processing section, provides a signal 204 at its output having a more stable frequency. Fast foreground AFC can thereby be used without affecting other receiver components that are sensitive to offset estimation errors and frequency variations.

Background processing section 156 accepts as input signal 170 which is stored in FIFO buffer 158. Signal 170 is buffered so that background processing section 156 may extract data as required. Signal 170 is passed to frame sync detector 182 and background AFC 184.

Background processing section 156 has two modes that follow signal 170 provided by FIFO buffer 158, namely unsynchronized and synchronized. In unsynchronized mode, frame sync detector 182 is active and searches for a frame sync signal. When a frame sync signal is detected, the mode switches to synchronized. Frame sync detector 182 then outputs third frequency control signal $f_{c3}$ 192 when a frame sync signal is detected. Since a frame sync signal has a known pattern, a frequency offset estimate based on a frame sync signal is a typically a better quality estimate than can be determined by an AFC unit such as 162 or 184, such that the associated frequency control signal $f_{c3}$ provides for more effective control of the oscillator 198 to correct for actual frequency offset. In synchronized mode, the frequency control signal 192 is combined with the second frequency control signal $f_{c2}$ 190 to generate a control signal for the oscillator 198 and thereby control the output signal 204, as described in further detail below.

In a preferred embodiment, background AFC 184 utilizes the same AFC algorithm as that of foreground AFC 162 to determine a second frequency control signal $f_{c2}$ 190. Thus, background AFC 184 may operate independently from foreground AFC 162. The second frequency control signal $f_{c2}$ 190 is preferably the inverse of frequency control 168. It is contemplated that, for example, the foreground AFC unit 162 may operate whenever a receiver in which it is implemented is within coverage of a communication network, whereas the background processing section 156 operates only when a received communication signal contains actual data for the particular receiver, to be processed by the detector 186 and possibly other receiver components.

DDAFC 188 provides a fourth frequency control signal $f_{c4}$ 194. Control signal $f_{c4}$ 194 is a slow frequency correction. DDAFC 188 attempts to track any changes in frequency of signal 204 that occur during synchronized mode. These changes are typically a result of transmitter imperfections in generating the received signal. Changes in the fading environment are another possible source of frequency changes during synchronized mode.

Control signals 190, 192 and 194 are summed at block 196. The output of block 196 is provided as a control input to oscillator 198, which produces signal 200. Mixer 202 accepts signal 200 and signal 170 to create signal 204 which is input to DET 186 and DDAFC 188. As described above, the mixer 202 will normally produce an output having frequency components at frequencies corresponding to the sum and difference of the frequencies of its inputs. Although not shown in FIG. 6, those skilled in the art will appreciate that one of the frequency components of signal 204 may be selected for processing by the detector 186, DDAFC 188 and further receiver components by filtering out the unwanted component. For example, an LPF may be coupled to the output of mixer 202 to provide the lower frequency component of the mixed signal as the signal 204.

Figure 7:
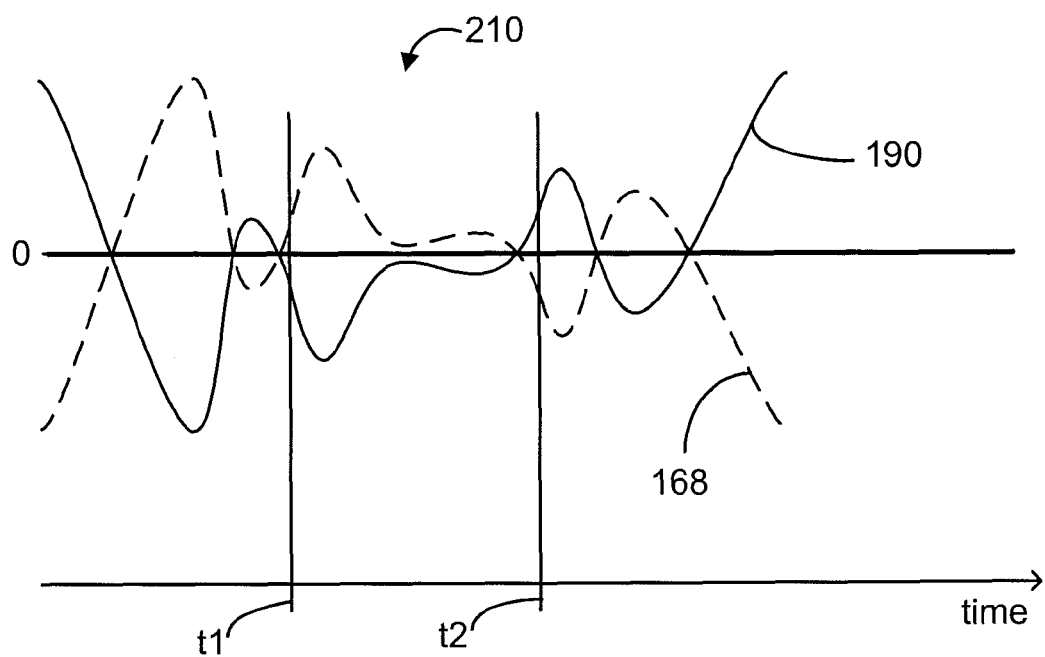
FIG. 7 is a timing diagram illustrating unsynchronized mode operation of the background processing section.

Referring now to FIG. 7, a timing diagram illustrating unsynchronized mode operation of background processing section 156 is shown generally as 210. Background processing section 156 tracks signal 170. As signal 170 is tracked, background AFC 184 generates a frequency control estimate and associated second frequency control signal 190, which is effectively the inverse of the first frequency control signal 168 provided by foreground AFC 162. When frequency control signals 190 and 168 are combined, they effectively cancel each other out. Thus the signal passed to detector 186 will be as close as possible to a representation of the original signal 164.

Figure 8:
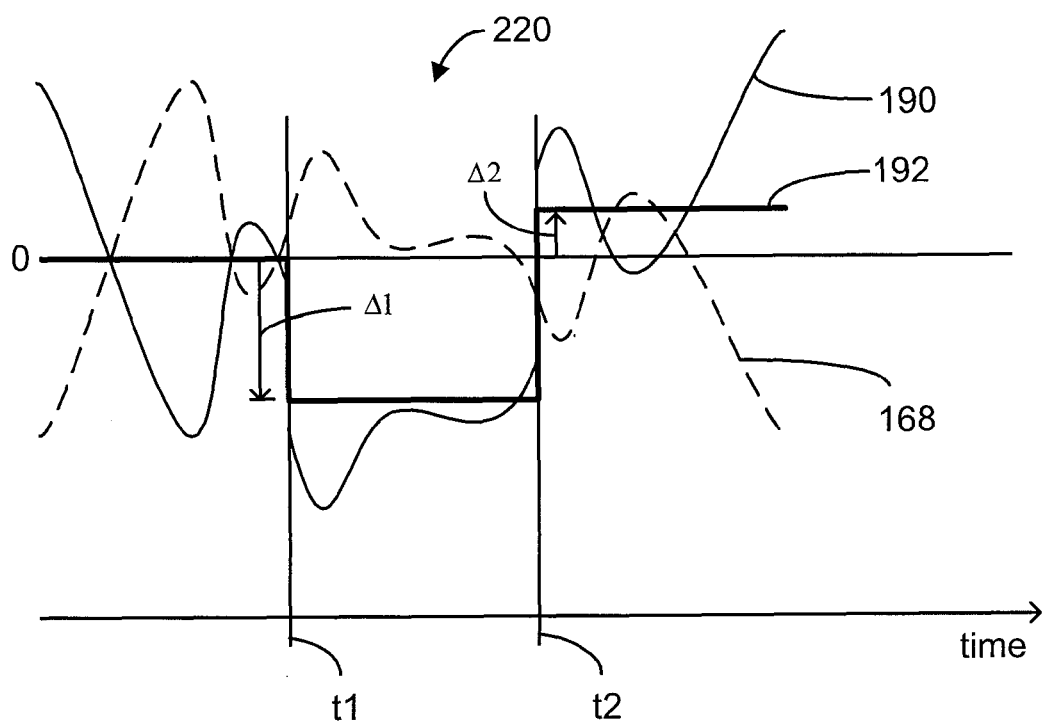
FIG. 8 is a timing diagram illustrating synchronized mode operation of the background processing section.

Referring now to FIG. 8, a timing diagram illustrating synchronized mode operation of background processing section 156 is shown generally as 220. As shown in FIG. 8, frame sync signals are assumed to have been received at times $t_1$ and $t_2$. Prior to receiving a frame sync signal, background processing section 156 operates in unsynchronized mode (as shown in FIG. 7). At time $t_1$, frame sync detector 182 accurately estimates frequency offset Δ1 based on the received frame sync signal and the third frequency control signal 192 required to correct the offset Δ1 is then generated. At time $t_2$, a second frame sync signal is detected by frame sync detector 182 which results in the generation of a new offset estimate and corresponding third frequency control signal 192. The value of this new control signal 192 is sufficient to correct for the new offset estimate shown as Δ2 in FIG. 8.

FIGS. 7 and 8 are conceptual representations only. The values of the second frequency control signal 190 would not necessarily be exact inverses of first frequency control signal 168 values, as background AFC 184 may operate at a different frequency than foreground AFC 162. Therefore, a frequency offset correction effected with a particular first frequency control signal value in the foreground AFC unit 162 may correspond to a different offset amount that could be inverted using a different second frequency control signal value in the background AFC unit 184. In such a case, the actual values of the frequency control signals 168 and 190 would be different, but the overall effect, inverting foreground AFC, would be the same. In FIG. 6 for example, the oscillator 171 is normally implemented as an analog oscillator, whereas the oscillator 198, part of the DSP 12, is a digital oscillator. A particular value of the second frequency control signal $f_{c2}$ may be required to invert, at the oscillator 198 and mixer 202, a frequency offset correction applied at the oscillator 171, mixer 178 and mixer 180 using a different value of the first frequency control signal $f_{c1}$. Different frequency control signal values might also be required for example when the foreground and background AFC units 162 and 184, or the oscillators 171 and 198 which they respectively control, operate at different frequencies.

Figure 9:
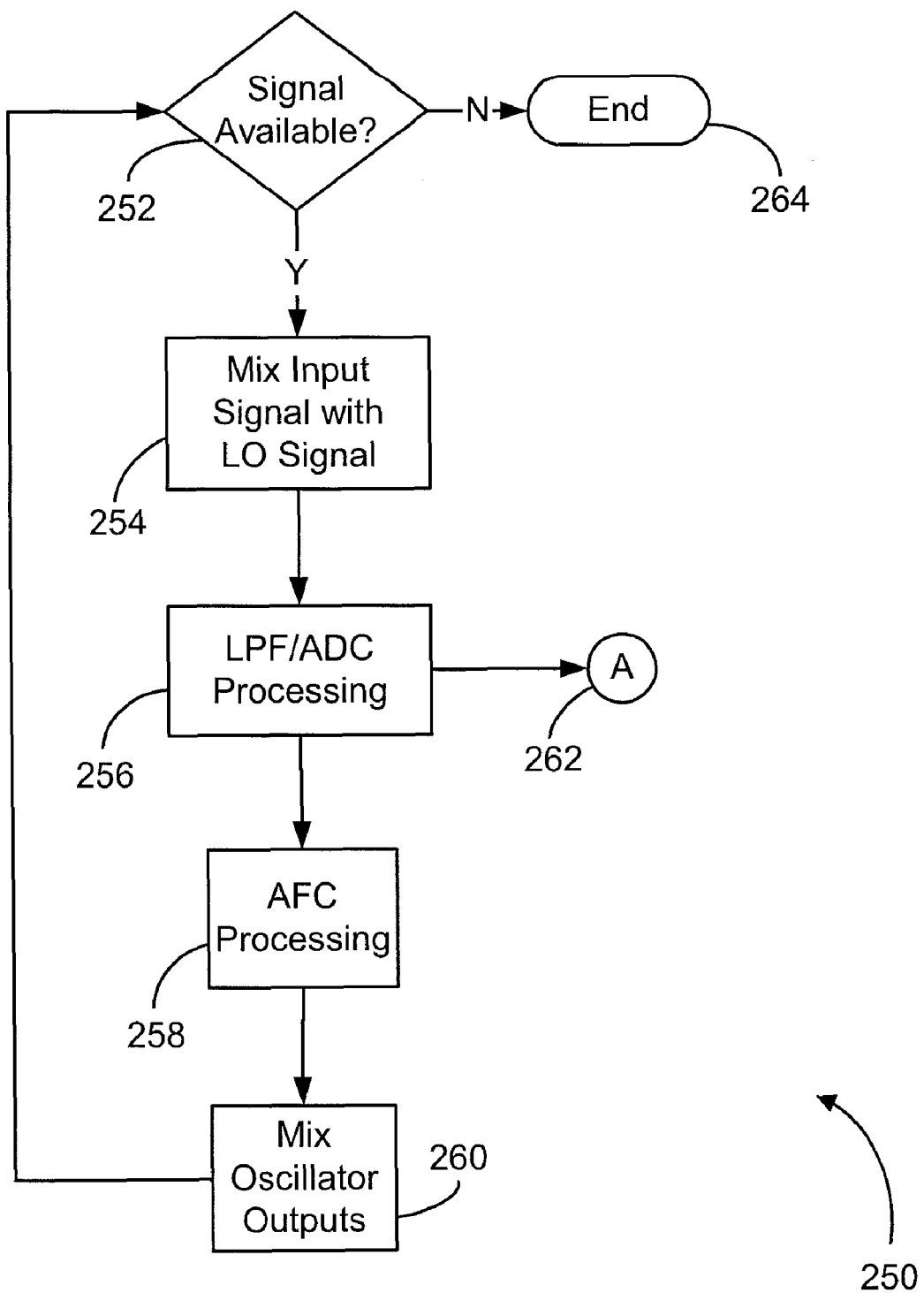
FIG. 9 is a flowchart of the foreground processing section process.

Referring now to FIG. 9, a flowchart of the foreground processing section process, is shown generally as 250. We suggest referring to FIG. 6 with FIG. 9 to best understand process 250. Any feature numbers mentioned below but not shown in FIG. 9 will be found in FIG. 6.

Process 250 begins at step 252 where a test is made to determine if signal 164 is available for processing. If no signal 164 is available, such as when a receiver is outside communication network coverage, process 250 ends at step 264. If signal 164 is available, process 250 moves to step 254. At step 254, signal 178 is mixed with the input signal 164 to create signal 166.

Moving next to step 256, signal 166 is processed by LPF/ADC 160 to create signal 170. Signal 170 is passed to FIFO buffer 158 at transfer point 262. Signal 170 is also passed by step 256 to step 258. At step 258, frequency control signal 168 is calculated by foreground AFC 162.

Moving next to step 260, frequency control signal 168 is input to the oscillator 171 to control the output thereof, and signal 174 from oscillator 172 and the output signal from the oscillator 171 are mixed to create an updated signal 178. Process 250 then returns to step 252 to determine if input signal 164 is still available for processing. As one skilled in the art will recognize, step 252 monitors for input signal 164 and will initiate process 250 upon receipt of signal 164.

Figure 10:
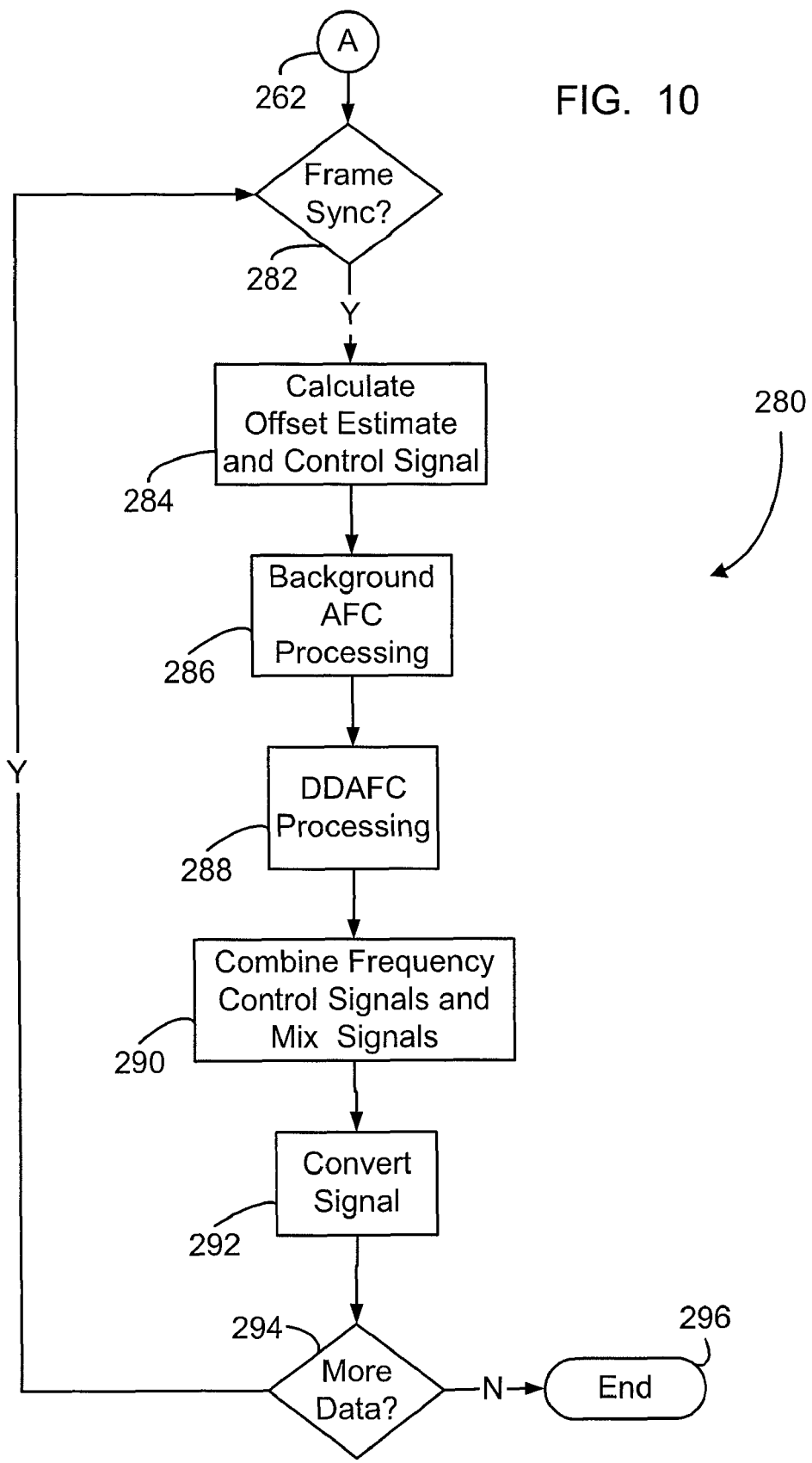
FIG. 10 is a flowchart of the background processing section process.

Referring now to FIG. 10, a flowchart of the background processing section process is shown generally as 280. To aid in understanding the following description, please refer to FIG. 6 in conjunction with FIG. 10. Process 280 begins at transfer point 262 where signal 170 is extracted from FIFO buffer 158. Moving to step 282, signal 170 is analyzed by frame sync detector 182 to determine if a frame sync has occurred. If no frame sync has been detected, processing moves to step 286. If a frame sync has been detected, processing moves to step 284 where an accurate offset estimate and corresponding frequency control signal 192 are calculated.

At step 286, frequency control signal 190 is generated by background AFC 184. Frequency control signal 190 inverts the effects of frequency control signal 168 generated by foreground AFC 162. Process 280 next moves to step 288 where DDAFC 188 generates frequency control signal 194 but only if background processing section 156 is operating in synchronized mode. Moving now to step 290, frequency control signals 190, 192 and 194 are combined and provided as a control input to the oscillator 198 to control the frequency of the signal 200. As discussed, signals 192 and 194 will only be present if background processing section 156 is operating in synchronized mode. In step 290, signal 170 is mixed with signal 200 to create signal 204 for input to DET 186. At step 292, signal 204 is processed by DET 186. At step 294 a test is made to determine if any more data exists in FIFO buffer 158. If data exists, processing returns to step 282. If no more data remains process 280 ends at step 296. As described above, processed data output by the detector 186 may be passed to other receiver components for further processing.

Although a particular architecture of receiver 150 has been illustrated in FIG. 6 and described herein, it is not the intent of the inventors to restrict the invention to the example provided. Many variants may exist, for example foreground AFC 162 may pass frequency control signals 168 via the FIFO buffer, thus eliminating the need for background AFC 184. Similarly, one or both of frame sync detector 192 or DDAFC 194 may be present in the foreground processing section 154 and provide their control signals to background processing section 156. It may also be possible to implement the controlled oscillator 171 and oscillator 172 as a single controlled oscillator. As can be appreciated by one skilled in the art, the design of receiver 150 is subject to a wide variety of design decisions.

Although described in the context of a particular receiver architecture, the foreground and background AFC control techniques described above may be applied to virtually any wireless communications device in which AFC is required or desired in conjunction with frequency offset- and frequency variation-sensitive components such as soft information processing modules.

The inventors do not intend to restrict the utilization of the present invention to a specific system. By way of example, the present invention may be utilized in mobile communication systems, hand-held communication devices, personal digital assistants (PDAs) with communication functions, wireless modems, cellular phones and one-way or two-way pagers. In essence, any device that receives RF signals affected by frequency offset.

The invention has been described with reference to certain specific embodiments. However, various modifications thereof will be apparent to those skilled in the art without departing from the spirit and scope of the invention as outlined in the claims appended hereto.

We claim:

1. A method for processing a signal, comprising:
generating a first frequency control signal that is used to control a frequency of a first reference signal;
processing a received signal using the first reference signal to generate an output signal;
generating a second frequency control signal that is used to control a frequency of a second reference signal; and
processing the output signal of a foreground processor using the second reference signal;
the first frequency control signal being an inverse of the second frequency control signal.

2. The method of claim 1 further comprising:
controlling the frequency of the second reference signal based on the sum of the first and second frequency control signals.

3. A method comprising:
mixing a first reference signal with a received signal to output an input signal;
converting the input signal to a filtered output;
generating a first frequency control signal from the filtered output;
generating a first oscillator output with a frequency based on the first frequency control signal;
mixing the first oscillator output with a second oscillator output to generate the first reference signal;
temporarily storing the filtered output;
generating a second frequency control signal from the filtered output; and
generating a third oscillator signal based on the second frequency control signal.

4. The method of claim 3, wherein the generating of the second frequency control signal is through the same AFC algorithm as the generating of the first frequency control signal.

5. The method of claim 3, wherein the second frequency control signal is approximately the inverse of the first frequency control signal.

6. The method of claim 3 further comprising:
receiving the filtered output to generate a third frequency control signal, wherein the generating of the third oscillator signal is based on both the second frequency control signal and the third frequency control signal.

* * * * *